2,872,435
(CYANOALKOXY)ALKYL SUBSTITUTED ORGANOSILICON COMPOUNDS

John L. Speier, Jr., Pittsburgh, Pa., assignor to Dow Corning Corporation, Midland, Mich., a corporation of Michigan No Drawing. Application August 15, 1956
Serial No. 604,059

7 Claims. (Cl. 260—46.5)

This invention relates to certain organosilicon compounds which contain (cyanoalkoxy)alkyl substituents attached to the silicon atoms therein, i. e. compounds in which a substituent of the type—$(CH_2)_mO(CH_2)_nCN$ is attached to a least 1 silicon atom per molecule.

It is an object of this invention to provide novel organosilicon compounds which have new and unusual properties in their own right as fluids, rubbers, and resins. Another object is to provide organosilicon compounds which can be employed as intermediates for the preparation of amide or carboxylic substituted organosilicon compounds. A further object is to provide organosilicon rubbers and resins which have an improved resistance to attack by organic solvents and oils.

The products of this invention take the form of monomers, polymers, or copolymers containing the silicon bonded (cyanoalkoxy)alkyl substituents. To be more specific, the 3 types of products within the scope of this invention take the form of:

(1) Compounds of the formula $$R_{3-x}X_xSi(CH_2)_mO(CH_2)_nCN$$

where R is a monovalent hydrocarbon radical free of aliphatic unsaturation, X is selected from the group consisting of Cl, Br, and alkoxy radicals of from 1 to 3 inclusive carbon atoms, $x$ is an integer of from 1 to 3 inclusive, $m$ is an integer of from 3 to 18 inclusive, and $n$ is an integer of from 2 to 17 inclusive;

(2) Organosiloxanes consisting essentially of units of the formula $$R_zSi[(CH_2)_mO(CH_2)_nCN]O_{\frac{3-z}{2}}$$

where R, $m$, and $n$ are as above defined and $z$ is an integer of from 0 to 2 inclusive; and (3) Copolymeric organosiloxanes consisting essentially of the units as defined in (2) and units of the formula $$R'_rSiO_{\frac{4-r}{2}}$$

where R' is selected from the group consisting of monovalent hydrocarbon radicals and halogenated monovalent hydrocarbon radicals and $r$ is an integer of from 0 to 3 inclusive.

The monomeric products of this invention can be obtained by reacting one or more hydrogenosilanes of the formula $R_{3-x}X_xSiH$ where R, $x$ and X are as above defined, with one or more compounds of the formula $CH_2=CH(CH_2)_yO(CH_2)_nCN$ where $y$ is an integer of from 1 to 16 inclusive and $n$ is as above defined, in the presence of chloroplatinic acid as a catalyst. Compounds where one or more X radicals are alkoxy radicals can also be produced by the alcoholysis or partial alcoholysis of the corresponding products wherein X is Cl or Br.

The polymeric and copolymeric siloxanes of this invention can be prepared by the hydrolysis of any one or more of the above described monomeric silanes in which at least one X substituent is attached to each silicon atom, or by the cohydrolysis of any 1 or more of such monomeric silanes with one or more silanes of the formula $R'_rSiX_{4-r}$ where R', X, and $r$ are as above defined. Monomeric silanes of the latter type are well known, and many are commercially available materials. The hydrolysis or cohydrolysis procedures discussed above can be carried out by the conventional techniques for organosilane hydrolysis known in the art, provided the conditions used are such that the nitrile groups are not hydrolyzed. It is often desirable to use an acid or alkaline catalyst for these hydrolysis reactions.

An alternative method for the preparation of certain polymers of this invention is that of reacting a silane of the formula $RSiH_3$ with the $$CH_2=CH(CH_2)_yO(CH_2)_nCN$$

compound in the presence of an organic peroxide in proportions and in a manner such that only one of the silicon bonded hydrogen atoms is replaced by the (cyanoalkoxy)alkyl substituent, and then hydrolyzing the remaining 2 hydrogen atoms on each silicon by a conventional alkaline catalyzed hydrolysis.

The polymers and copolymers of this invention may also be prepared by reacting a corresponding polymeric or copolymeric organosiloxane which contains one or more silicon bonded hydrogen atoms per molecule with the unsubstituted cyanoalkoxy reactant, using chloroplatinic acid as the catalyst. Copolymers can also be prepared by known organopolysiloxane copolymerization techniques, using the siloxanes defined in (2) and conventional siloxanes of the general formula $$R'_rSiO_{\frac{4-r}{2}}$$

as reactants, with the usual alkaline or acid catalysts for siloxane polymerization. Here again, however, the conditions should be such that the nitrile groups are not hydrolyzed. In general, such polymerization reactions are preferably carried out under anhydrous conditions and at temperatures below 100° C., with polar solvents such as acetonitrile present to facilitate the interaction.

The chloroplatinic acid employed as a catalyst in the above described reactions is preferably used in an amount ranging from $1\times10^{-7}$ to $1\times10^{-3}$ mol per mol of the unsaturated reactant. To facilitate handling the relatively small amounts of catalyst required, it is convenient to employ a solution of the catalyst in an organic solvent for this acid, such as isopropanol. The commercially available form of the acid, and hence most preferred form, is the hydrate, $H_2PtCl_6 \cdot 6H_2O$.

With many of the described reactants, the chloroplatinic acid catalyst promotes the reaction at room temperature. The resulting exothermic reaction can either be allowed to take its own course or can be subjected to cooling in order to keep the reaction at any desired convenient operating temperature. Ordinarily temperatures above 150° C. are not necessary with any of the described reactants in order to promote the desired reaction. Atmospheric, superatmospheric, or reduced pressures can be employed as desired.

These catalyzed reactions can be illustrated in simplified form by the following equation:

$$\equiv SiH + CH_2=CHCH_2OCH_2CH_2CN \rightarrow$$
$$\equiv SiCH_2CH_2CH_2OCH_2CH_2CN$$

The R radicals in the above describe reactants and products are monovalent hydrocarbon radicals which are free of aliphatic unsaturation. Examples of suitable radicals of this type are alkyl such methyl, ethyl and octadecyl; alkaryl such as tolyl, aralkyl such as benzyl, cycloaliphatic such as cyclohexyl, and aryl such as phenyl and xenyl. The R' radicals can be monovalent hydrocarbon radicals and/or halogenated monovalent hydrocarbon radicals. Thus these radicals include not only those which have been described above in regard to the R radicals, but also alkenyl radicals such as vinyl, allyl, octadecenyl, and cyclohexenyl, as well as halogenated derivatives such as dichlorophenyl, bromophenyl, tetrafluoroethyl, α,α,α-trifluorotolyl, tetrabromoxenyl, chlorocyclohexyl and chlorovinyl radicals. The most preferred R and R′ radicals are methyl, ethyl and phenyl. Both the R and R′ can be either the same or different radicals in each organosilicon compound.

In the copolymers of this invention which contain the

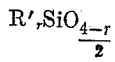

units, it is preferred that the copolymer contain at least 1 mol percent of the (cyanoalkoxy)alkyl substituted units defined in (2) above. It is also preferred in these copolymers that the former organosiloxane units be present in amounts and in forms such that $r$ in the above formula will have an average value of from 0.5 to 3 inclusive. In other words, when $SiO_2$ polymeric units are present in the copolymers, sufficient $R'SiO_{1.5}$, $R'_2SiO$, or $R'_3SiO_{.5}$ units should be present so that $r$ has an average value of at least 0.5. It is to be understood that the polymers and copolymers of this invention in their incompletely condensed state can contain small amounts (e. g. up to 2 or 3 percent by weight) of silicon bonded hydroxy and/or alkoxy radicals, as is common in organosiloxane polymers.

The monomeric organosilanes of this invention are mostly fluid in nature, and they, as well as the fluid polymers and copolymers, can be used as lubricants, hydraulic fluids and the like. Where the monomers contain hydrolyzable substituents, they can be used as treating agents to render various materials (such as paper, textiles, and masonry) water repellent. The monomeric silanes are also useful as intermediates in the production of the polymeric and copolymeric organosiloxane of this invention. The polymers and copolymers can be either fluid, rubbery, or resinous in nature, depending largely upon the average degree of substitution (number of organic groups attached to silicon per silicon atom) in the molecule.

In general, those products which have an average degree of substitution of less than about 1.95 are resinous in nature and can be used for molding compounds, impregnants, electrical insulating varnishes and the like. Those materials which have an average degree of substitution of from about 1.95 to 2.05 can be polymerized to high molecular weight materials of a rubbery nature. Such rubbers are useful in the same applications as the well known conventional silicone rubbers, and may be prepared in the usual manner by compounding the siloxane with a vulcanizing agent (and if desired with a filler) and thereafter vulcanizing the composition at the appropriate temperature. The vulcanizing agents normally employed with siloxanes are operative. Such agents include organic peroxides such as benzoyl peroxide, t-butylperbenzoate and chlorobenzoyl peroxide; combinations of alkoxypolysilicates such as ethyl polysilicate with salts of carboxylic acids such as lead octoate and dibutyltindiacetate; combinations of hydrogen containing siloxanes such as those of the unit formula (MeHSiO) and salts of carboxylic acids such as zinc naphthenate; and sulfur with or without accelerators. When sulfur is employed the siloxane must contain alkenyl groups.

Both the rubbers and resins of this invention are characterized, after they have been cured, by an improved resistance to the softening and swelling ordinarily caused by organic solvents and oils. Such properties are of obvious importance in many applications. All of the products of this invention can undergo organic type reactions typical of the nitrile group to provide, e. g., amide and carboxylic substituted organosilicon compounds.

The following examples are illustrative only. For simplicity the symbols Me, Et, Vi, i-Pr, and Ph are used herein to designate methyl, ethyl, vinyl, isopropyl, and phenyl respectively.

*Example 1*

A mixture containing 0.5 mol allyloxypropionitrile, $CH_2=CHCH_2O(CH_2)_2CN$, and $2 \times 10^{-5}$ mol chloroplatinic acid was prepared and 0.6 mol of $MeHSiCl_2$ was added thereto over a period of 2 hours. The resulting exothermic reaction maintained the reaction temperature at 100°–120° C. without the application of external heat. The reaction mass was distilled and 78 percent of the theoretical yield of [3-(2-cyanoethoxy)propyl]methyldichlorosilane, $MeCl_2Si(CH_2)_3O(CH_2)_2CN$, was obtained. This compound boiled between 158 and 164° C. at a pressure of from 11 to 13 mm. Hg, $n_D^{25}$ 1.4571, $d_4^{25}$ 1.137, $R_D$ 0.2396 (calculated value =2.2402). An analysis showed a neutral equivalent of 113.0 as compared to the theoretical value of 113.1. When this compound is reacted with isopropanol, the compound $$Me(i-PrO)_2Si(CH_2)_3O(CH_2)_2CN$$

is obtained. When the $MeHSiCl_2$ in the above reaction is replaced by $HSiBr_3$ in an otherwise identical process, the compound $Br_3Si(CH_2)_3O(CH_2)_2CN$ is produced. When $MePh(EtO)SiH$ is used as the silane reactant, the product is $MePh(EtO)Si(CH_2)_3O(CH_2)_2CN$.

*Example 2*

A solution of $MeCl_2Si(CH_2)_3O(CH_2)_2CN$ in an equal weight of benzene was hydrolyzed by adding it to water. The hydrolyzate was washed free of HCl and the solvent removed to give a fluid polymeric siloxane containing the units $OSiMe[(CH_2)_3O(CH_2)_2CN]$, $n_D^{25}$ 1.4620. An analysis of this siloxane showed 16.3 percent by weight Si as compared to the theoretical value of 16.4 percent. The hydrolysis of $Br_3Si(CH_2)_3O(CH_2)_2CN$ in a like manner produces a benzene solution of a resinous polymeric siloxane containing units of the formula $$O_{1.5}Si(CH_2)_3O(CH_2)_2CN$$

The similar hydrolysis of $$MePh(EtO)Si(CH_2)_3O(CH_2)_2CN$$

followed by strip distilling the benzene from the washed hydrolyzate, produces a fluid disiloxane of the formula $[MePh[NC(CH_2)_2O(CH_2)_3]Si]_2O$. The latter can also be prepared by reacting $(MePhHSi)_2O$ with allyloxypropionitrile in the presence of chloroplatinic acid.

*Example 3*

When 0.6 mol $EtHSiCl_2$ is reacted with 0.5 mol $CH_2=CH(CH_2)_{16}O(CH_2)_2CN$ in the presence of chloroplatinic acid in the manner of Example 1, and the unreacted excess $EtHSiCl_2$ is then strip distilled from the reaction mass, the residue contains the silane $$EtCl_2Si(CH_2)_{18}O(CH_2)_2CN$$

*Example 4*

When $MeHSiCl_2$ is reacted with $$CH_2=CHCH_2O(CH_2)_{17}CN$$

in the presence of chloroplatinic acid by the method of Example 3, the silane $MeCl_2Si(CH_2)_3O(CH_2)_{17}CN$ is produced.

*Example 5*

When an equimolar mixture of $$MeCl_2Si(CH_2)_3O(CH_2)_2CN$$

and $Me_2SiCl_2$ in an equal weight of benzene is cohydrolyzed by adding it to water, followed by washing the hydrolyzate free of HCl, removing the benzene therefrom, and heating the cohydrolyzate for 3 hours at 90° C.

in the presence of the salt Me₃SiOK in an amount of 1 K atom per 5,000 Si atoms, an extremely viscous copolymeric siloxane containing the polymeric units Me₂SiO and OSiMe[(CH₂)₃O(CH₂)₂CN] is produced.

*Example 6*

When a mixture containing 10 mols of the

OSiMe[(CH₂)₃O(CH₂)₂CN]

as produced in Example 2 and 1 mol of hexamethyldisiloxane is heated at 90° C. for 3 hours in the presence of Me₃SiOK in an amount of 1 K atoms per 5,000 Si atoms, a highly viscous fluid of the average general formula Me₃SiO[MeSi[(CH₂)₃O(CH₂)₂CN]O]₁₀SiMe₃ is obtained.

*Example 7*

When an equimolar mixture of

MeCl₂Si(CH₂)₃O(CH₂)₂CN, ViSiCl₃, MeSiCl₃

ClC₆H₄MeSiCl₂ and C₁₈H₃₇MeSiCl₂ is cohydrolyzed by adding a benzene solution thereof to an excess of water, followed by washing the cohydrolyzate free of HCl, there is obtained a benzene solution of a resinous copolymeric siloxane containing 20 molar percent of each of the units OSiMe[(CH₂)₃O(CH₂)₂CN], ViSiO₁.₅, MeSiO₁.₅

ClC₆H₄MeSiO, and C₁₈H₃₇MeSiO.

That which is claimed is:

1. Compounds of the formula $$R_{3-x}X_xSi(CH_2)_3O(CH_2)_2CN$$

where R is a monovalent hydrocarbon radical free of aliphatic unsaturation, X is selected from the group consisting of Cl, Br, and alkoxy radicals of from 1 to 3 inclusive carbon atoms, and x is an integer of from 1 to 3 inclusive.

2. Compounds of the formula $$(CH_3)_{3-x}Cl_xSi(CH_2)_3O(CH_2)_2CN$$

where x is an integer of from 1 to 3 inclusive.

3. The compound of the formula $$CH_3Cl_2Si(CH_2)_3O(CH_2)_2CN$$

4. Organosiloxanes consisting essentially of units of the formula $$R_zSi[(CH_2)_3O(CH_2)_2CN]O_{\frac{3-z}{2}}$$

where R is a monovalent hydrocarbon radical free of aliphatic unsaturation and z is an integer of from 0 to 2 inclusive.

5. An organosiloxane consisting essentially of units of the formula CH₃Si[(CH₂)₃O(CH₂)₂CN]O.

6. Copolymeric organosiloxanes consisting essentially of units of the formula $$R_zSi[(CH_2)_3O(CH_2)_2CN]O_{\frac{3-z}{2}}$$

where R is a monovalent hydrocarbon radical free of aliphatic unsaturation and z is an integer of from 0 to 2 inclusive, and units of the formula $$R'_rSiO_{\frac{4-r}{2}}$$

where R' is selected from the group consisting of monovalent hydrocarbon radicals and halogenated monovalent hydrocarbon radicals and r is an integer of from 0 to 3 inclusive.

7. A copolymeric organosiloxane consisting essentially of units of the formula CH₃Si[(CH₂)₃O(CH₂)₂CN]O and units of the formula (CH₃)₂SiO, there being present at least 1 molar percent of the former units in the copolymer.

References Cited in the file of this patent

UNITED STATES PATENTS 2,687,424    Sommer  ---------------- Aug. 24, 1954

OTHER REFERENCES

Sommer et al.: J. A. C. S., vol. 73, No. 2, page 882, February 1951.

Astle et al.: Ind. and Engineering Chem., vol. 44 (1952), pages 2871–2872.

Sommer et al.: J. A. C. S., vol. 75, No. 12, pages 2932–2934, June 20, 1953.